April 17, 1928.
O. C. SCHMIDT
STUFFING MACHINE
Filed Sept. 16, 1927
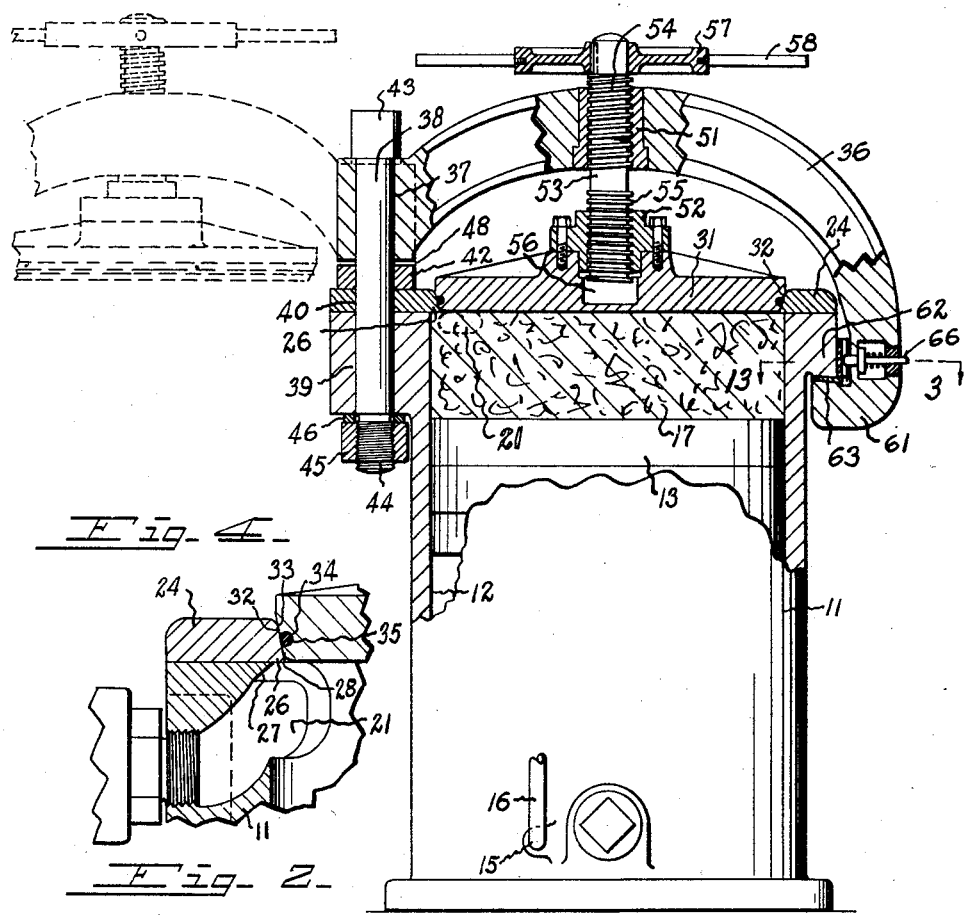
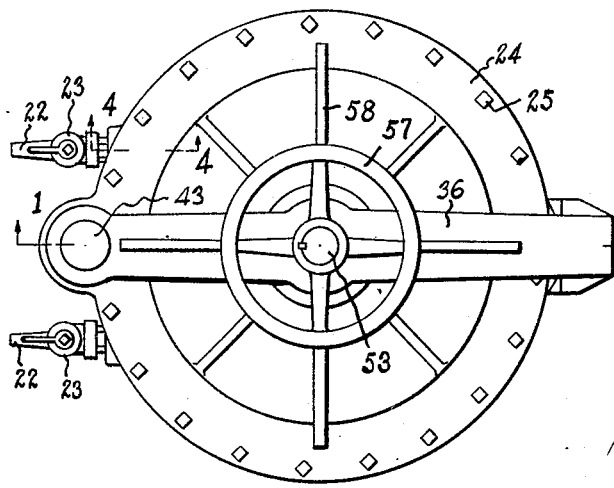
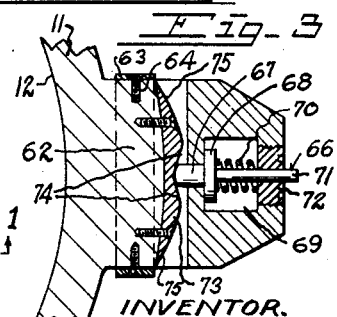
INVENTOR.

Patented Apr. 17, 1928.

1,666,631

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

STUFFING MACHINE.

Application filed September 16, 1927. Serial No. 219,942.

My invention relates to stuffing machines applicable for stuffing sausage casings, and extruding meat dough and other plastic materials. My invention is particularly applicable in the meat industry.

It is the object of my invention to provide new and improved means for closing the casing or container of the stuffing machine; to provide novel means whereby the cover of the stuffing machine is supported and moved; to provide novel means for clamping the cover in place; to provide novel means whereby emptying of the casing is assured; and to provide novel means whereby accidental movement of the press-head out of the casing is avoided.

The invention will be further readily understood from the following description and claims, and from the drawings, in which latter:

Fig. 1 is a side elevation of my improved device, partly in axial section taken on the line 1—1 of Fig. 2, and partly broken away, and showing the yoke and cover in clamped position in full lines, and swung back in dotted lines.

Fig. 2 is a plan view of the same.

Fig. 3 is a horizontal section of a detail view taken in the plane of the line 3—3 of Fig. 1; and, Fig. 4 is an enlarged vertical section of a detail taken on the line 4—4 of Fig. 2.

In the present exemplification of my improved device, the stuffing machine comprises a casing 11, which has an inner wall 12, which is preferably cylindrical. A press-head 13 is caused to move up and down in said casing. This press-head is of usual construction. The meat-dough or other plastic material is placed in the casing at one end of the press-head and pressure is applied to the other end of the press-head. This pressure is usually obtained by compressed fluid, such as air, water or steam, received through a port 15 in the lower end of the casing. A feed-pipe 16 has connection with said port and is provided with a usual control valve for causing the compressed fluid to enter or discharge from the operating end of the casing. The pressure by the compressed fluid upon the press-head causes pressure upon the body 17 of material in the material end of the casing.

The material end of the casing is provided with an exit-port 21. A nozzle 22 is suitably secured to the exit-port, a feed-valve 23 being located between the nozzle and the casing for controlling the exit of the material from the casing by the pressure of the press-head thereon.

The pressure required to move the press-head is dependent on the weight of the press-head and the consistency of the material. This pressure is often very great and it has happened that the press-head has been accidently forced or blown out of the casing by the pressure in rear thereof.

In order to safely confine the press-head within the casing, a safety-ring 24 is fixed at one end of the casing, being shown bolted to the upper end of the casing by means of bolts 25. This safety-ring forms a radially inwardly extending annular ledge 26, which overlaps the end of the inner wall of the casing. The upper wall 27 of the exit-port 21 slants upwardly at its inner end so that the inner end of said upper wall is substantially in the plane of the lower face 28 of said inwardly extending annular ledge. This lower face is preferably flat.

A cover 31 is provided for the casing. It has an outer annular periphery 32, which converges downwardly and inwardly, to form one wall of the joint with the safety-ring. The safety-ring is provided with an inner periphery 33, which converges radially inwardly and downwardly and is complemental to the inwardly and downwardly converging outer periphery of the cover, forming a seat for the latter. The outer periphery of the cover is provided with an annular groove 34, in which an annular packing ring 35 is received, which is preferably resilient, as by being made of soft rubber.

The packing ring coacts with the seat in the safety-ring and insures a tight joint between the safety-ring and the cover. This annular groove is preferably cross-sectionally in the form substantially of a sector of a circle including the major part of the circle, and the annular packing ring 35 is preferably round in cross-section, with only a small sector of its circular outer periphery exposed beyond the outer periphery of the cover, in order that compression of the packing ring may be obtained when seating the cover without injury to the packing ring.

The bottom of the cover is preferably flat and when seated is preferably in the plane of the lower face of the annular ledge 26 formed by the safety-ring. The top of the press-head is also preferably flat. This relation of parts has the advantage that when the press-head is moved in extruding direction, that the upper face of the press-head and the lower faces of said annular ledge and cover may substantially come in contact so as to force out or extrude substantially all of the material in the casing, the upper portion of the inner end of the exit port receiving the last of the material thus forced out or extruded.

The cover is mounted on a yoke 36, which has a bearing 37 about a pivot-rod 38, located in a bearing 39 in the casing and a bearing 40 in the safety-ring. A washer 42 is interposed between the safety-ring and the bearing 37. The pivot-rod has a head 43 at one end, its other end being threaded as at 44 for reception of a nut 45, a washer 46 being interposed between the nut and the bearing 39.

Slight movement in axial direction is permitted the yoke as indicated by the space 48 between the bearing 37 and the washer 42. The yoke supports the cover which depends from the yoke. The yoke with the cover thereon is arranged to swing on the pivoting means between the casing and one end of the yoke for moving the cover either partially or entirely away from the top of the casing. The yoke can be swung so as to place the cover in front of the discharge side of the casing, so that the casing may be charged with the material either from the rear or from either side thereof.

The yoke is provided with a nut 51, a nut 52 is secured to the cover. The nuts are threaded in opposite directions, the one being a right hand thread and the other a left hand thread. A screw-rod 53 is provided with threads 54, 55, at its respective ends, which lead in opposite directions and are complement to the respective threads in the nuts 51, 52. The cover is provided with a recess 56 for reception of the lower end of the screw-rod. The upper end of the screw-rod has a turning means 57 secured thereto, shown as a wheel provided with arms 58. When the wheel is turned, rotation of the screw causes axial movement of the cover a distance which is the sum of the leads of the complemental threads thereon, for quick axial movement of the cover and rapidly opening and closing the casing.

The swinging end of the yoke is provided with a hook 61 rigid therewith, which is received under a lug 62 rigid with the casing. The lower end of said lug is provided with a hardened facing strip 63 to resist wear between the parts. This facing strip is fixed to the lug by screws 64 received through the upturned ends of the facing strip and threaded into the lug 62. The complemental faces of this facing strip and of the hook form stops to limit outward axial movement of the yoke. When the screw-rod 53 is turned to raise the cover, the yoke drops by gravity so that its bearing 37 rests on the washer 42 for closing the space 48. The swinging end of the yoke also descends so as to distance the hook 61 from its complemental stop 63 on the casing an axial distance equal to the space 48 for ready release of the yoke and permitting ready and easy swinging of the yoke and the cover supported thereby.

A latch 66 is arranged to center the yoke with relation to the casing, so as to center the cover with relation to the safety-ring. The latch exemplified comprises a plunger 67, provided with a collar 68 in a recess 69 in the swinging end of the yoke, a spring 70 being received about the stem 71 of said plunger between said collar and a plug 72 threaded in the outer end of said recess. The latch end of the plunger coacts with a keeper 73, which has converging faces 74 with which the inner rounded end of the plunger coacts, for locating the inner end of the plunger in the bottom of the groove formed by said converging faces, in which relation the cover is central with relation to its seat.

The keeper is further provided with outer inclined faces 75 which form riding faces for the plunger when swinging the yoke into central position from either direction. The groove formed by the converging faces 74 extends in axial direction, so that axial movement of the yoke may take place by rotation of the screw-rod 53 for seating or unseating the cover while said yoke is maintained in central position.

In the present exemplification the press-head is moved in extruding direction by the pressure of compressed fluid under the same, the press-head moving in opposite direction by the force of its weight and the release of the compressed fluid thereunder.

The meat-dough is usually shoveled into the top of the casing, the cover 31 having been swung out of the way, thereby also removing the packing-ring 35 from the danger of being contacted by the shovel or other implement used in filling the casing.

Having thus fully described my invention, what I claim as new, and desire to secure by Letters Patent, is:

1. In a stuffing machine of the character described, the combination of a casing, a press-head operable therein, a cover for said casing, a yoke about the end of said casing across said cover, means for moving said cover on said yoke toward and from said end of said casing for closing and opening said end, means for pivoting one end of said yoke to said casing permitting axial movement of said yoke at the pivot thereof, a stop for said axial movement, a stop between the swinging end of said yoke and said casing for limiting axial movement of said yoke at said swinging end, and an automatic spring latch including a spring-pressed plunger and complemental laterally inclined faces between said swinging end of said yoke and said casing, means to permit automatic resilient movement of said spring-pressed plunger in directions radial with relation to said casing, said inclined faces converging laterally, and constructed and arranged for automatically laterally centering said cover in both directions with relation to said casing, and said converging inclined faces forming a slot parallel with said axial movement permitting such axial movement of said swinging end whilst maintaining said cover in such centered relation.

2. In a stuffing machine of the character described, the combination of a casing provided with a cylindrical inner wall, a press-head operable therein, a safety-ring secured at the upper end of said casing and forming an annular ledge provided with a flat inner end radially inwardly overlapping the end of said inner wall and limiting outward movement of said press-head, said safety-ring provided with a seat and a cover having a flat inner end and received in said safety-ring for being seated in said safety-ring, said flat inner end of said cover and said flat inner end of said annular ledge located in substantially the same plane perpendicular to the axis of said casing when said cover is so seated in said safety-ring, said casing provided with an exit port, the inner end of whose upper wall is substantially in the said plane in which said flat inner end of said cover and said inner end of said annular ledge are located when said cover is so seated in said safety-ring, and said press-head provided with a flat top arranged to coact with said inner ends of said annular ledge and of said cover for pressing substantially all the material between said press-head and said cover out of said casing and preventing outward movement of said press-head beyond said inner end of said annular ledge.

3. In a stuffing machine of the character described, the combination of a casing provided with a cylindrical inner wall, a press-head operable therein, a safety-ring secured at the end of said casing and forming an annular ledge provided with an inner annular flange face extending radially inwardly overlapping the end of said inner wall and forming an inner flange-face limiting outward movement of said press-head, said safety-ring provided with an annular inwardly downwardly converging inner periphery forming a seat for a cover, a cover having an annular inwardly downwardly converging outer periphery which converges downwardly complemental to said inwardly converging inner periphery of said safety-ring, said cover provided with an inner flat end, said outer periphery of said cover provided with an annular slot, and an annular resilient packing ring in said slot coacting with said inwardly converging inner periphery of said safety-ring, whereby radially outward pressure is exerted on said packing ring to compress said packing ring upon seating of said cover, and said annular inwardly downwardly converging peripheries of said safety-ring and of said cover so related as to position said inner flat end of said cover and said inner flange-face of said safety-ring in substantially the same horizontal plane upon seating of said cover.

In testimony whereof, I have hereunto signed my name.

OSCAR C. SCHMIDT.